US010028084B2

(12) United States Patent
Chen et al.

(10) Patent No.: US 10,028,084 B2
(45) Date of Patent: Jul. 17, 2018

(54) ADAPTIVE POSITION INDICATOR

(71) Applicant: QUALCOMM Incorporated, San Diego, CA (US)

(72) Inventors: Yin Chen, Campbell, CA (US); Saumitra Mohan Das, Santa Clara, CA (US); Payam Pakzad, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/618,977

(22) Filed: Feb. 10, 2015

(65) Prior Publication Data

US 2016/0234635 A1 Aug. 11, 2016

(51) Int. Cl.

| H04W 24/00 | (2009.01) |
| H04W 4/02 | (2018.01) |
| G01S 1/06 | (2006.01) |
| H04W 4/04 | (2009.01) |

(52) U.S. Cl.
CPC ............... *H04W 4/02* (2013.01); *G01S 1/06* (2013.01); *H04W 4/043* (2013.01)

(58) Field of Classification Search
CPC .................................. H04W 4/02; H04W 4/043
USPC .............................. 455/457, 456.1, 456.3, 404.2
See application file for complete search history.

(56) References Cited

U.S. PATENT DOCUMENTS

| 8,000,726 | B2 * | 8/2011 | Altman | G06Q 30/0207 455/456.1 |
| 8,154,401 | B1 * | 4/2012 | Bertagna | H04W 4/021 340/539.13 |
| 8,565,790 | B2 * | 10/2013 | Gupta | G01C 21/20 455/41.2 |
| 8,571,580 | B2 * | 10/2013 | Altman | G06Q 30/0207 455/414.3 |
| 8,712,686 | B2 * | 4/2014 | Bandyopadhyay | G01C 17/38 701/445 |
| 8,725,175 | B2 * | 5/2014 | Altman | G06Q 30/0207 455/435.1 |

(Continued)

FOREIGN PATENT DOCUMENTS

EP 2528360 A1 11/2012
WO WO-2013065042 A1 5/2013

OTHER PUBLICATIONS

Duckham M., et al., "Location Privacy and Location-Aware Computing", Chapter 3, Dec. 1, 2005 (Dec. 1, 2005), XP055264502, pp. 1-20, Retrieved from the Internet: URL: http://www.geosensor.net/papers/duckham06.IGIS.pdf [retrieved on Apr. 12, 2016].

(Continued)

*Primary Examiner* — Marceau Milord
(74) *Attorney, Agent, or Firm* — Kilpatrick Townsend & Stockton

(57) ABSTRACT

Methods, systems, computer-readable media, and apparatuses for determining a position indicator are presented. In some embodiments, position data indicating a position of a mobile device is obtained. A position indicator is determined based on at least one region of a map. The position of the mobile device is located within the at least one region. The position indicator indicates a map-feature-dependent region of the map. The position indicator is provided.

21 Claims, 12 Drawing Sheets

(56) References Cited

U.S. PATENT DOCUMENTS

| | | | | |
|---|---|---|---|---|
| 8,781,494 B2* | 7/2014 | Kuehnel | | H04W 4/02 |
| | | | | 455/456.1 |
| 8,938,211 B2* | 1/2015 | Das | | H04W 4/04 |
| | | | | 370/338 |
| 8,971,924 B2* | 3/2015 | Pai | | H04W 4/02 |
| | | | | 455/404.2 |
| 9,080,882 B2* | 7/2015 | Gupta | | G01C 21/206 |
| 9,140,559 B2* | 9/2015 | Khorashadi | | G01C 21/20 |
| 9,275,282 B2* | 3/2016 | Das | | G01C 21/206 |
| 9,361,889 B2* | 6/2016 | Chao | | G10L 15/30 |
| 9,389,085 B2* | 7/2016 | Khorashadi | | G01C 21/20 |
| 2010/0039929 A1* | 2/2010 | Cho | | G01S 5/0252 |
| | | | | 370/216 |
| 2011/0140962 A1* | 6/2011 | McNamara | | G01S 5/02 |
| | | | | 342/357.64 |
| 2011/0176494 A1* | 7/2011 | Huang | | G01S 5/02 |
| | | | | 370/329 |
| 2011/0241872 A1 | 10/2011 | Mahaffey | | |
| 2012/0046050 A1* | 2/2012 | Hymel | | H04W 4/028 |
| | | | | 455/456.3 |
| 2012/0063427 A1* | 3/2012 | Kandekar | | G06Q 30/0251 |
| | | | | 370/338 |
| 2012/0149388 A1* | 6/2012 | West | | G01S 5/00 |
| | | | | 455/456.1 |
| 2013/0029685 A1* | 1/2013 | Moshfeghi | | G01S 19/48 |
| | | | | 455/456.1 |
| 2013/0045759 A1 | 2/2013 | Smith | | |
| 2013/0080457 A1* | 3/2013 | Narayanan | | H04W 4/021 |
| | | | | 707/758 |
| 2013/0281122 A1* | 10/2013 | Zelinka | | H04W 64/00 |
| | | | | 455/456.3 |
| 2014/0141803 A1* | 5/2014 | Marti | | H04W 4/043 |
| | | | | 455/456.2 |
| 2014/0171098 A1* | 6/2014 | Marti | | G01S 5/0252 |
| | | | | 455/456.1 |
| 2014/0171114 A1* | 6/2014 | Marti | | G01C 21/10 |
| | | | | 455/456.2 |
| 2014/0223553 A1* | 8/2014 | Gupta | | G06F 21/52 |
| | | | | 726/22 |
| 2014/0250191 A1 | 9/2014 | Altman et al. | | |
| 2014/0274043 A1* | 9/2014 | Das | | H04W 48/20 |
| | | | | 455/434 |
| 2014/0274108 A1* | 9/2014 | Venkatraman | | H04W 64/00 |
| | | | | 455/456.1 |
| 2014/0329538 A1* | 11/2014 | Zhang | | G01S 5/021 |
| | | | | 455/456.1 |
| 2014/0335893 A1 | 11/2014 | Ronen | | |
| 2014/0350850 A1* | 11/2014 | Kmiecik | | G01C 21/005 |
| | | | | 701/487 |
| 2015/0105099 A1* | 4/2015 | Luo | | H04W 64/003 |
| | | | | 455/456.1 |
| 2015/0172872 A1* | 6/2015 | Alsehly | | G01S 5/0236 |
| | | | | 455/457 |
| 2015/0178565 A1* | 6/2015 | Rivlin | | G06T 7/004 |
| | | | | 382/103 |
| 2016/0142875 A1* | 5/2016 | Awoniyi-Oteri | | H04W 4/023 |
| | | | | 455/456.2 |

OTHER PUBLICATIONS

International Search Report and Written Opinion—PCT/US2016/013016—ISA/EPO—Apr. 19, 2016.

Fleishman G., "How the iPhone knows where you are," Apr. 28, 2011, 5 pages.

Hong J.I., et.al., "An Architecture for Privacy-Sensitive Ubiquitous Computing", The Second International Conference on Mobile Systems, Applications and Services, Boston, Massachusetts, USA, Jun. 6, 2004, pp. 177-189, XP058145437.

* cited by examiner

ADAPTIVE POSITION INDICATOR

BACKGROUND

Aspects of the disclosure relate to displaying the position of a mobile device on a map.

In some locations, a position of a mobile device may not be determinable or a position may be determinable with low accuracy. For example, a lack of access point coverage in a part of a wireless local area network positioning environment may lead to a situation in which a server has insufficient data to determine a mobile device position with a high degree of accuracy. Similarly, when a mobile device is receiving insufficient data from global positioning system (GPS) satellites, the mobile device may be unable to determine its position.

When a position of a device has been temporarily undeterminable and the device subsequently regains the ability to determine its position, a displayed point indicator, used to indicate a position of the mobile device, may jump from a previously indicated position to a current position. The position of a point indicator may vary rapidly over time when a position of a mobile device can be determined with low accuracy. Point indicators that jump from one location to another or have positions that vary rapidly over time may be potentially confusing or distracting to a user.

A point indicator and/or precise coordinate indication of a mobile device location may indicate the position of a user's mobile device with a greater extent of accuracy than desired by the user. The user's privacy and/or safety may be compromised when a precise indication of the user's position is made available to other users, service providers, etc.

BRIEF SUMMARY

Certain aspects are described that determine a position indicator.

In one example, a method for determining a position indicator is disclosed. The method includes obtaining position data indicating a position of a mobile device. A position indicator is determined based on at least one region of a map. The position of the mobile device is located within the at least one region. The position indicator indicates a map-feature-dependent region of the map. The position indicator is provided.

In another example, a system is disclosed. The system includes a processor. The processor is configured to obtain position data indicating a position of a mobile device. The processor determines a position indicator based on at least one region of a map. The position of the mobile device is located within the at least one region. The position indicator indicates a map-feature-dependent region of the map. The processor provides the position indicator.

In a further example, a non-transitory computer-readable storage medium comprising one or more programs is disclosed. The one or more programs are configured to be executed by a processor for performing a method of determining a position of a mobile device. The one or more programs include instructions for obtaining position data indicating a position of a mobile device. The one or more programs additionally include instructions for determining a position indicator based on at least one region of a map. The position of the mobile device is located within the at least one region. The position indicator indicates a map-feature-dependent region of the map. The one or more programs further include instructions for providing the position indicator.

In an additional example, a mobile device is disclosed. The mobile device includes means for obtaining position data indicating a position of the mobile device. The mobile device additionally includes means for determining the position indicator based on the at least one region of a map. The position of the mobile device is located within the at least one region. The position indicator indicates a map-feature-dependent region of the map. The mobile device further includes means for providing the position indicator.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
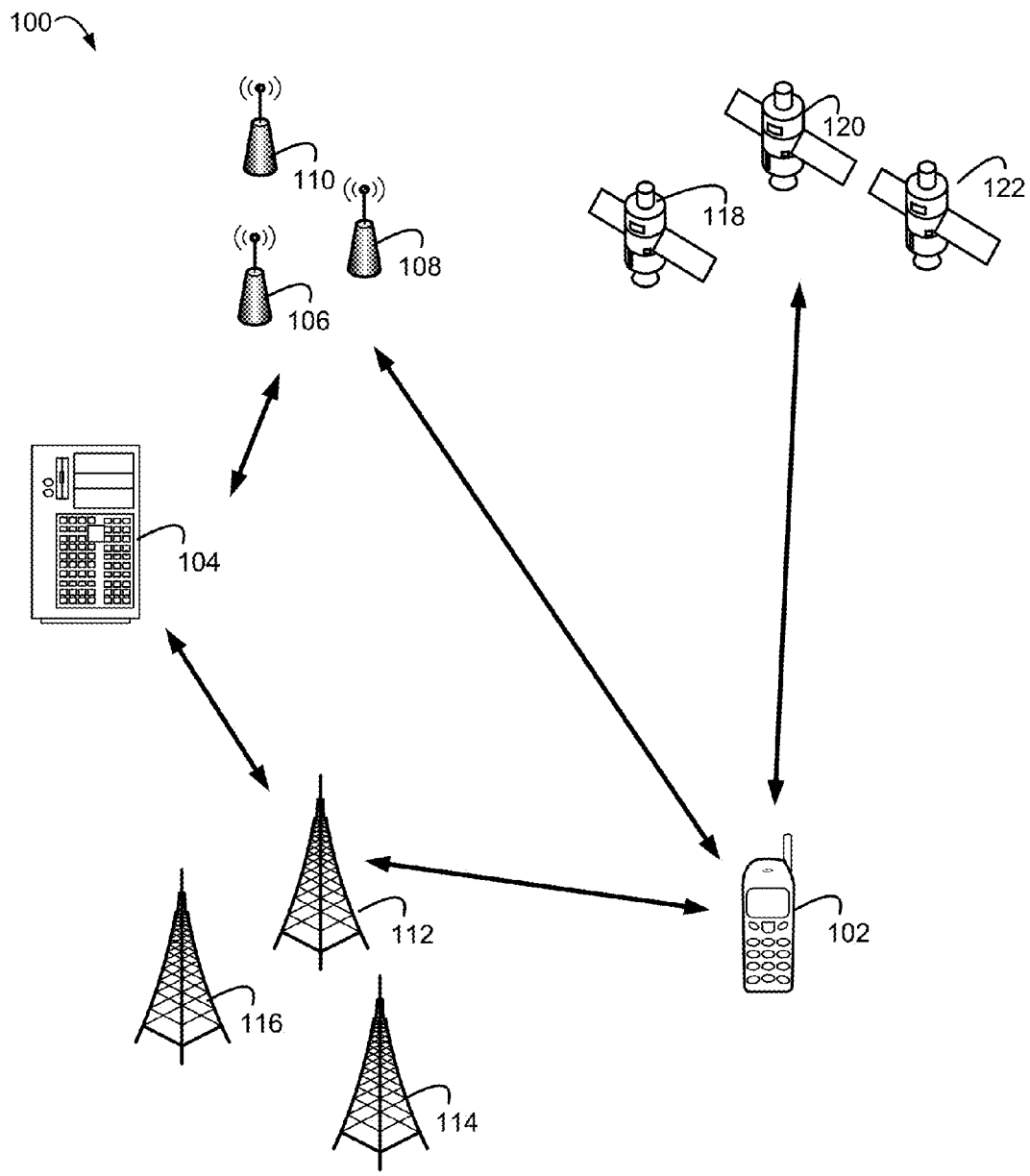
FIG. 1 illustrates a terrestrial network and satellite positioning system that may be implemented for determining a position of a mobile device.

Several illustrative embodiments will now be described with respect to the accompanying drawings. While particular embodiments, in which one or more aspects of the disclosure may be implemented, are described below, other embodiments may be used and various modifications may be made without departing from the scope of the disclosure or the spirit of the appended claims.

A device may display the position of a mobile device using a position indicator, such as a point indicator, shown on a map.

In some embodiments, available positioning data may be insufficient to calculate a position with a desired degree of accuracy. For example, it may not be possible to determine a position using available positioning data. In another example, the degree of accuracy to which a position can be determined may be insufficient, e.g., a metric for determining positioning accuracy falls below a threshold value, such as a threshold value set by a user.

Determining a position indicator based on a determination of positioning accuracy (e.g., changing the way in which a position indicator is displayed) may be beneficial in various regards. Displaying a position indicator that indicates a map-feature-dependent region of a map may provide an aesthetically pleasing indication of position, may generally indicate a position of a user's device while protecting the privacy and/or safety of the user, may allow for tracking of a mobile device location on a regional basis (rather than more detailed location tracking), etc.

In other embodiments, a user may wish to limit the accuracy with which a mobile device position is made available to third parties.

As used herein, "mobile device" may refer to any mobile electronic computing device. The mobile device may be capable of receiving positioning data transmitted by an access point (AP), a global positioning system (GPS) satellite, a positioning server, and/or other positioning system component. Examples of mobile devices may include smartphones, laptop computers, portable gaming systems, wearable devices, devices installed in automobiles, robotics, specialized electronic devices for positioning, and/or any other such electronic device. Additional examples of mobile devices and computing devices may be disclosed in relationship to FIGS. 10-11 below.

As used herein, "position indicator" may refer to any image, icon, pointer, symbol, text, region, and/or other indication means for indicating a position. A position indicator may be a point, area, and/or volume. The position indicator may be displayed on a map and/or model to indicate a position of a mobile device.

As used herein, "position data" may refer to any data received by a mobile device related to the position of the mobile device. Position data may include, for example: identifying information for access points (APs) available for use by a user device; received signal strength indication (RSSI) from an AP; maps of RSSI for individual APs; round-trip signal propagation time (RTT); time of arrival (TOA) data; accuracy data, including data indicating a value of a metric for positioning accuracy; a GPS navigation message and/or other positioning data received from a satellite vehicle (SV); positioning data for a landmark-based positioning system, and information indicating a location of a mobile device, such as values for a latitude and a longitude, and/or other coordinates for indicating a location.

As described herein, the term "user" refers to any person that interacts with a network-based system capable of determining a position of a mobile device. Such persons may have mobile devices associated with them that interact electronically with a network-based positioning system. Such persons may indicate information about regions in a map, which information may be provided to a network-based positioning system.

As used herein, "access point", or AP, refers to a device connected as part of a network that may be accessed by a user's mobile device. Such a network may provide wireless access to a broader network using a particular wireless networking protocol such as an IEEE 802.11 protocol, Bluetooth, and/or any other wireless communication method.

Figure 2:
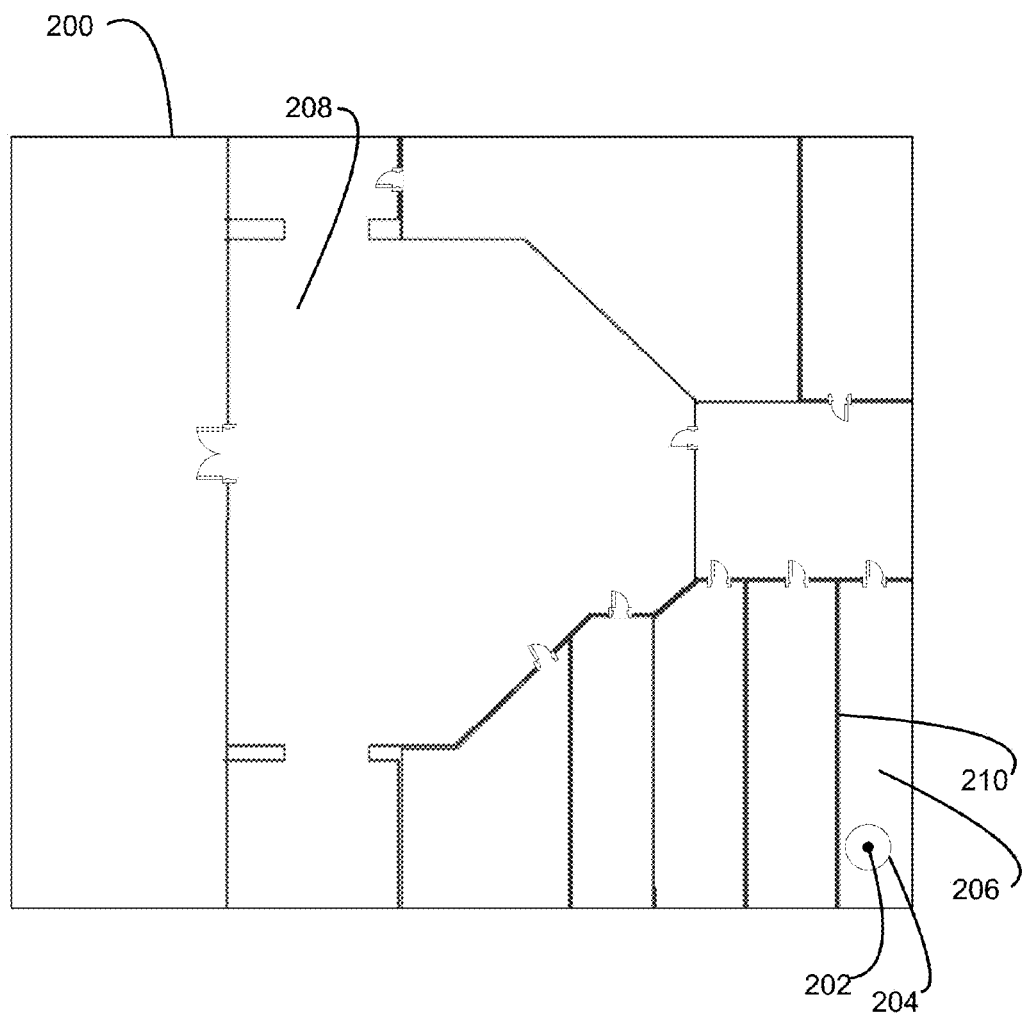
FIG. 2 illustrates a point indicator displayed on a map, according to some embodiments.

Embodiments described herein may be implemented using any positioning network such as a terrestrial network system, described with regard to FIG. 1, and/or a satellite network system, described with regard to FIG. 2.

FIG. 1 illustrates a terrestrial network and satellite positioning system that may be implemented for determining a position of a mobile device, according to some embodiments. Terrestrial network and satellite positioning system 100 may include mobile device 102; server 104; multiple access points (APs), for example, AP 106, AP 108, and AP 110; multiple base stations, for example, base station 112, base station 114, and base station 116; and multiple satellite vehicles (SVs), e.g., SV 118, SV 120, and SV 122.

Server 104 may comprise one or more computing devices capable of processing location data and/or communicating with mobile device 102 regarding position data. Server 104 may access data from a database (not shown). The database may be stored on one or more computing devices of server 104, and/or may be stored on one or more devices that are remote from and communicatively coupled to server 104. Server 104 may be located on site in an area for which position data is being provided, and/or may be located remotely from such an area.

Access points 106-110 may be communicatively coupled to server 104 and any other available infrastructure computing devices by wired and/or wireless connections. Access points 106-110 may communicate with mobile device 102 using network connectivity and/or other wireless connectivity (e.g., Wi-Fi, Bluetooth and the like).

In some embodiments, a terrestrial network system includes multiple base stations, e.g., base stations 112, 114, and 116. A terrestrial network may provide voice and/or data communication for a number of mobile devices including mobile device 102 via base stations 112-116. In some embodiments, data communications received by mobile device via base stations 112-116 may include position data. Communications between mobile device 102 and base stations 112-116 may occur via a cellular network, such as CDMA, LTE, WiMAX, and the like.

A terrestrial network system may be used to determine a position for mobile device 102 using signals transmitted from one or more base stations 112-116 and/or APs 106-110. Environments in which a terrestrial network system may be used to determine a position for mobile device 102 may include indoor environments, walkable distance environments, and other environments having a similar scale, such as: shopping malls, airports, sports arenas, educational campuses, commercial campuses, convention centers, and the like.

Mobile device 102 may receive and/or observe position data from base stations 112-116 and/or APs 106-110, which may be at known locations. Position data received and/or observed by mobile device 102 from base stations 112-116 and/or APs 106-110 may include, e.g., RSSI, RTT, and TOA.

Mobile device 102 may use the position data to estimate distances between mobile device 102 and multiple base stations 112-116 and/or APs 106-110. Mobile device 102 may use the estimated distances and known locations to perform trilateration or other position analysis techniques to estimate the position of mobile device 102.

In some embodiments, mobile device 102 may provide received and/or observed position data to server 104. Server 104 may use the position data to estimate a distance between mobile device 102 and multiple base stations 112-116 and/or APs 106-110. Server 104 may use the estimated distances and known locations to perform trilateration or other position analysis techniques to estimate the position of mobile device 102. Server 104 may provide position data indicating the position of mobile device 102 to mobile device 102. For example, server 104 may transmit location coordinates of mobile device 102 to mobile device 102.

In another example, mobile device 102 or server 104 may compare position data, such as RSSI, RTT, and/or TOA for multiple APs 106-110 and/or base stations 112-116, to a heat map that provides expected signal strengths for the multiple APs 106-110 and/or base stations 112-116 at various positions (e.g., a grid of points) in an environment. Mobile device 102 or server 104 may determine the location of mobile device 102 using pattern matching and/or another analysis technique. For example, pattern matching may include finding location coordinates at which RSSIs for the multiple APs 106-110 and/or base stations 112-116 as determined from a heat map most closely match the RSSIs observed by mobile device 102.

Heat map information corresponding to APs 106-110 and/or base stations 112-116 may be collected using different techniques. For example, a dedicated device may be used to measure signal strength at certain locations and send the measured data to a location server. Server 104 may store the heat map information corresponding to and provide the information to mobile device 102.

In some embodiments, a crowd-sourcing scheme may be used to generate heat map information. For example, a plurality of mobile devices 102 may participate in crowd-sourcing. The participating mobile devices 102 may receive and/or observe position data from APs 106-110 and/or base stations 112-116. The participating mobile devices 102 may transmit the position data to server 104. Server 104 may use the received position data to determine position data including a heat map, positions of APs 106-110, RSSI information for APs 106-110 at various locations relative to APs 106-110, etc. The position data determined by server 104 may be used for determining a position of mobile device 102.

A satellite network system that may be implemented for determining a position of mobile device may include mobile device 102 and multiple satellite vehicles (SV), e.g., SV 118, SV 120, and SV 122. A satellite positioning system may comprise one or more satellite positioning systems, such as GPS, GNSS, Beidou, GLONASS, and/or Galileo, and the like. Mobile device 102 may receive signals from one or more of SVs 118-122.

In one example, mobile device 102 may receive and/or observe position data from one or more of SVs 118-122, such as one or more signals from SVs 118-122. Mobile device 102 may determine a position of mobile device 102 using position data from SVs 118-122.

Another example of a positioning technique that may be used by mobile device 102 or server 104 to determine a position of mobile device 102 is landmark-based positioning.

When a mobile device determines that available positioning data is insufficient to calculate a position with a desired degree of accuracy, the mobile device may indicate this by changing the way in which a position indicator is displayed. Various approaches to assessing accuracy are discussed below.

In some embodiments, when a position of mobile device 102 is determined by server 104, position data received by mobile device 102 from server 104 may include accuracy data associated with the determined position. When mobile device 102 determines its own position, mobile device 102 may determine accuracy data associated with the determined position.

Mobile device 102 and/or server 104 may evaluate accuracy data to determine the accuracy with which a position of mobile device 102 was determined. Based on the determined accuracy, mobile device 102 and/or server 104 may determine a type of position indicator to display, such as point indicator and/or a region indicator as discussed below.

In some embodiments, accuracy data for multiple locations of a particular environment, e.g., a heat map, may be stored by mobile device 102 and/or server 104. When a position is determined for mobile device 102, heat map data at the determined position may be compared with one or more threshold values. For example, accuracy data may include RSSI data received by the mobile device 102 from APs 106-110. An accuracy criterion may be satisfied when mobile device 102 receives RSSI data exceeding a threshold value from a minimum number of APs (e.g., 3 APs). A threshold RSSI value may be, e.g., −80 db to −40 db, for example a threshold value in the range of −70 db to −50 db, e.g. −60 db.

Accuracy data may include a horizontal dilution of precision (HDOP) value. An accuracy criterion may be satisfied when an HDOP value is less than a threshold value. Mobile device 102 may receive position data including an HDOP value associated with a determined position for mobile device 102. For example, a server that stores HDOP values associated with locations of an environment may determine an HDOP value associated with a determined position for mobile device 102 and provide the HDOP value to mobile device 102. In some embodiments, mobile device 102 receives multiple HDOP values associated with locations of an environment. Mobile device 102 may determine an HDOP value associated with a determined position for mobile device 102. Mobile device may compare an HDOP value to a threshold HDOP value. A threshold HDOP value may be a value in the range of 1-8, such as 1-4, e.g., 2.

Accuracy data may include a maximum variation in a position determined for mobile device 102 over a span of time (i.e., a period of time). An accuracy criterion may be satisfied when the total movement of mobile device 102 (e.g., along a path such as path 306), as determined from position data, is less than a threshold distance over a period of time. The period of time may be a period in the range of, e.g., 1-60 seconds, such as a period in a range of 5-30 seconds, e.g., 20 seconds. A threshold distance may be a distance in the range of 5-50 feet, such as a distance in the range of 10-30 feet, e.g., 20 feet.

Mobile device 102 may compare the position data determined for mobile device 102 over a period of time with the output of one or more sensors of the mobile device 102 for the period of time. The sensors may include, e.g., an accelerometer of mobile device 102. For example, if a variation in a position determined for mobile device 102 over a period of time exceeds a distance traveled by the mobile device over the same period of time as determined by an accelerometer of mobile device 102, positioning accuracy may not be accurately determinable. An accuracy criterion may be satisfied when a divergence between a total movement of mobile device 102, over a period of time, as determined from position data, varies by less than a threshold difference in distance from a total movement of the mobile device 102, over the same period of time, as determined by a sensor of the mobile device. A threshold difference (i.e., delta) in distance as determined from position data and as determined by a sensor of the mobile device may be a distance in the range of 1-20 feet, such as a distance in the range of 3-10 feet, e.g., 5 feet.

In some embodiments, one or more accuracy criteria are based on a default or user-defined setting indicating a desired level of accuracy. For example, a user may wish to share the position of a mobile device with third parties. The user may wish to limit the accuracy with which a third party can view the user's position. A user may define a setting, such as a preference to display a region indicator and/or a point indicator, a preferred region type, a distance, or other indication of the accuracy with which a third party can view the position of the mobile device. Accuracy criteria indicating desired level of position display accuracy may be stored by, e.g., mobile device 102 and/or server 104.

FIG. 2 illustrates a position indicator displayed on a map, according to some embodiments. A position indicator may be a point indicator 202 displayed on a map 200. The position indicator may be displayed on a display of mobile device 102 or another display. Point indicator 202 may be a dot, as shown, or another shape, image or other indicator for indicating a location of mobile device 102. In some embodiments, point indicator 202 may be shown at the center of an uncertainty indicator 204 having a size (e.g., a radius of a circle) corresponding to a determined accuracy of the position of mobile device 102. The uncertainty indicator 204 may be a circle, as shown, or other shape, image, or other indicator for indicating a degree of uncertainty of the determined position of mobile device 102. Uncertainty indicator 204 may indicate a range of possible locations of mobile device 102.

In the illustrative example of FIG. 2, map 200 is a floor plan. Alternative maps may be used, such as a road map, trail map, neighborhood map, three-dimensional model of a multi-level structure, or any other map for providing locational information. Map 200 may be received by mobile device 102 from server 104.

Map 200 may include a plurality of regions, such as region 206 and region 208. Regions (e.g., 206, 208) may be map-feature-dependent regions. Map-feature-dependent regions may be areas defined by features of a map, such as roads, walls, partitions, property lines, borders, natural features, etc. Map-feature-dependent regions may exclude subsections of a map that are arbitrary subsections of a map, such as cells of a rectangular grid. For example, a map-feature-dependent region for an indoor map may be a region bounded or partially bounded by walls, such as a room. An example of a map-feature-dependent region for an outdoor map may be a neighborhood area bounded by multiple roadways. Additional examples of regions may include one or more floors of multi-story buildings, one or more buildings, one or more seating sections, one or more airport gates, one or more city blocks, one or more lakes, one or more parking areas, one or more street sections, one or more cities, one or more routes, one or more subsections of map 200, or any combination thereof.

Region 206 is a room in which point indicator 202 is displayed to indicate a determined position of mobile device 102 within region 206. In the illustrative example of FIG. 2, region 206 is shown bounded by four walls, including the wall shown at 210. A boundary may be a structural boundary; such as a wall, partition, and/or street; a non-structural boundary; such as a property line, border and/or other division between regions; a user-input boundary indication; etc.; or any combination thereof.

A region may include two or more sub-regions. For example, if a region is a floor of a building, (e.g., map 200 may be a floor of a building), the floor may include sub-regions (e.g., sub-regions 206, 208). Where regions are discussed herein, it will be realized that sub-regions may be used.

In some embodiments, a user may define map-feature-dependent regions. For example, a user may define a map-feature-dependent region such as region 206. A user may use a user interface module of a computer system, such as mobile device 102, to define region information. A user may define region information by drawing, selecting, or otherwise indicating boundaries and/or partial boundaries for one or more regions 206 on a map 200. In another example, a user may define region information by overlaying a geometrical object on map 200 to indicate a region corresponding to the geometrical object. In a further example, a user may define region information by painting or otherwise indicating an area associated with a region, such as region 206. A user may additionally provide identifying information, such as room number, room name, floor number, floor name, building name, and/or other metadata associated with indicated regions.

In some embodiments, a map analysis module may be used to automatically determine map-feature-dependent regions of a map 200. For example, a map analysis module may analyze information available visibly, numerically, or otherwise in a map 200. A map analysis module may use image analysis, e.g., to locate boundaries, differently colored areas, or other indications of regions that may be included in a map. The map analysis module may also employ image detection, image tracking, image recognition techniques and/or extraction techniques to determine regions, boundaries, etc. in the map. The map analysis module may take into consideration metadata information, such as building information, user trajectory data, etc. In some embodiments, the map analysis module may determine boundaries using a threshold distance, e.g., a minimum distance between walls. For example, if no boundary exists in a map or in a region for a threshold distance, such as a distance exceeding 30 feet, a boundary may be established within the map or region, e.g., halfway between existing boundaries or a fixed distance from an existing boundary. The map analysis module may transmit region information to server 104 and/or store region information at server 104.

Figure 3:
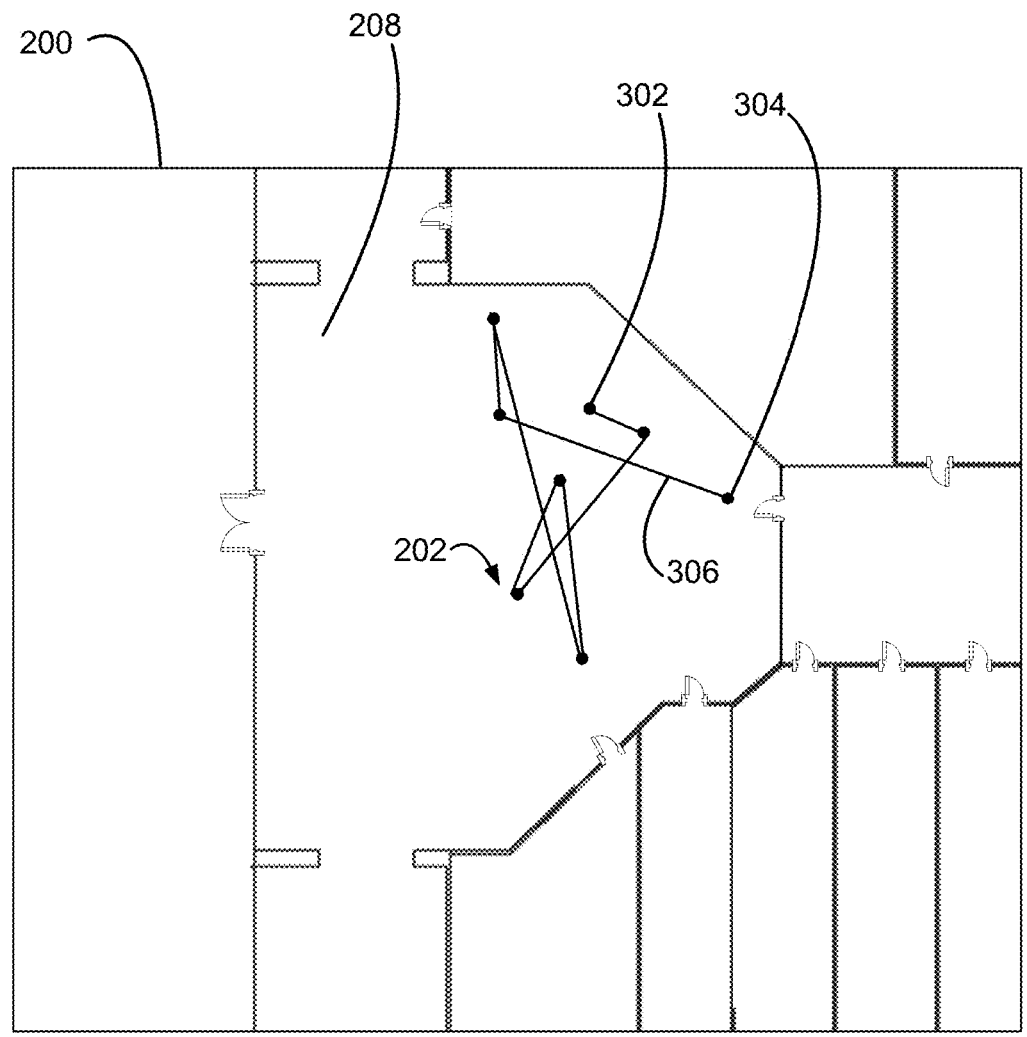
FIG. 3 illustrates a series of positions determined for a mobile device over a span of time, according to some embodiments.

FIG. 3 illustrates a series of positions determined for a mobile device over a period of time, according to some embodiments. Point indicator 202 is shown at eight positions in map 200, moving from a first position 302 to an eighth position 304 along a path indicated at 306.

When positions determined for mobile device 102 are not accurately determinable, the determined positions may vary greatly over time, even when the actual position of a mobile device 102 is not changing. Low accuracy position determinations may occur due to, e.g., a relatively small number of APs 106-110 in an area of a map 200 such as a region 208, and/or structural barriers blocking line of sight between a mobile device 102 and APs 106-110. In such a situation, a user viewing a map 200 displayed by mobile device 102 may see a point indicator 202 that hops (e.g., along path 306) from one part of a region 208 (e.g., as indicated at position 302) to another part of a region 208 (e.g., as indicated at position 304) over a short period of time. This may distract or confuse the user. In such cases, it may be desirable to display a region indicator, e.g., as described with regard to FIGS. 4-6, in addition to or in lieu of a point indicator.

Figure 4:
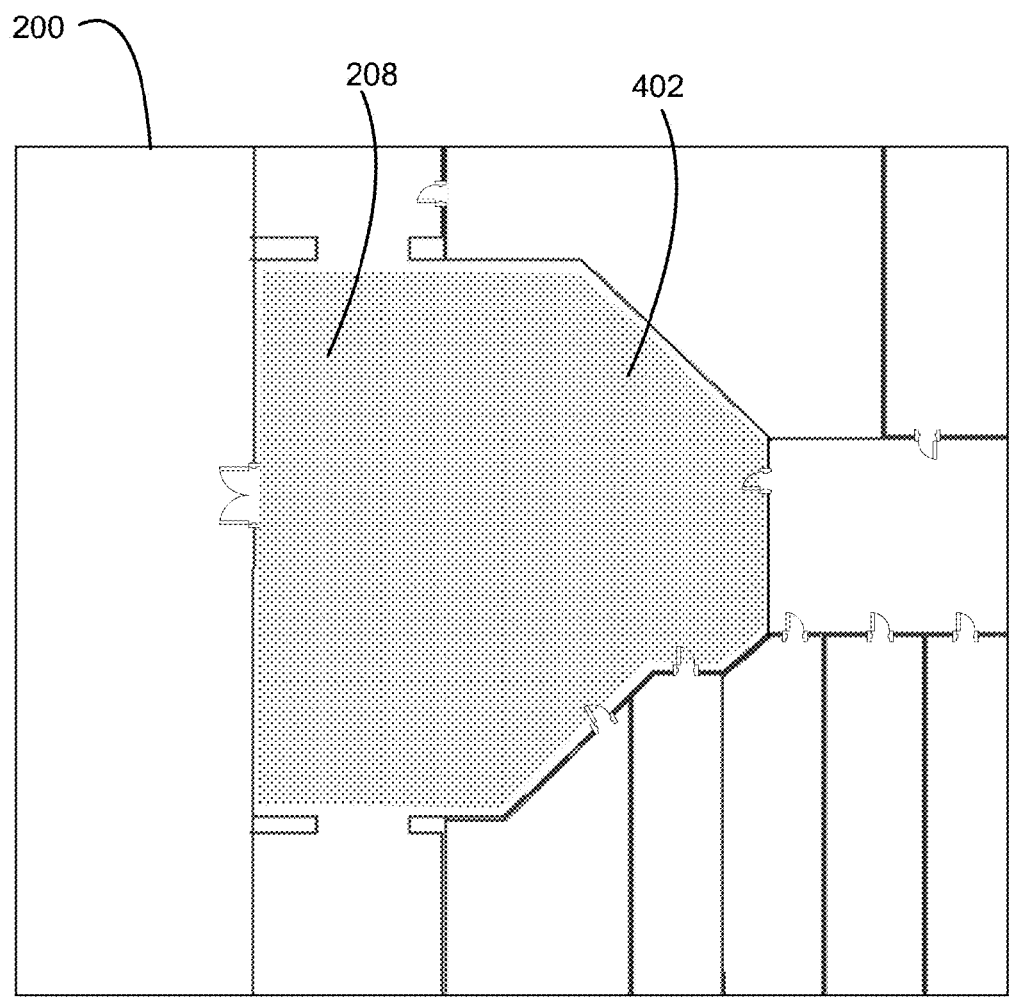
FIG. 4 illustrates a region indicator displayed on a map, according to some embodiments.

FIG. 4 illustrates a region indicator displayed on a map, according to some embodiments. Region indicator 402 is a position indicator that may be displayed on a map 200 on a display of mobile device 102. Region indicator 402 indicates that a determined position of mobile device 102 is within region 208. In some embodiments, when position data is not accurately determinable, region indicator 402 may be displayed. Position data may not be accurately determinable when position data is unavailable and/or when position data does not satisfy an accuracy condition.

Region indicator 402 may be displayed on a map 200 on a display, e.g., a display of mobile device 102. In some embodiments, the size of region indicator 402 may be larger than the size of point indicator 202. Region indicator 402 may have a shape that is visually associated with a region, such as a shape that matches or is similar to a shape of a region. For example, region indicator 402 has a shape that is similar to the shape of region 208. The shape of region indicator 402 may be user-defined or automatically determined as indicated above. Region indicator 402 may include text or other indicia, e.g., text identifying a region. Region indicator 402 may include features to visually distinguish region indicator 402 from map 200. For example, region indicator 402 may be highlighted, e.g., with coloring, patterning, bolding, flashing, etc. of an area, text, boundary, and/or other element or elements of region indicator 402. In one embodiment, the region indicator may be smaller than the indicated region or may be bigger than the indicated region.

When position data is accurately determinable and/or when a user desires for a mobile device location to be viewable with precision, point indicator 202 may be displayed. Region indicator 402 may be used when position data is not accurately determinable and/or when a user desires to display a mobile device location generally without indicating the precise position of the device. In some embodiments, region indicator 402 may be displayed only when point indicator 202 is not displayed. In other embodiments, region indicator 402 and point indicator 202 are displayed at the same time.

A user may use a toggle control to indicate whether region indicator 402 and/or point indicator 202 are to be displayed on map 200. For example, a user may select a toggle function using a toggle button of a user interface that displays map 200 and one or more of region indicator 402 and point indicator 202. In some embodiments, a user may tap region indicator 402 to toggle to point indicator 202 or the user may tap point indicator 202 to toggle to region indicator 402.

Figure 5:
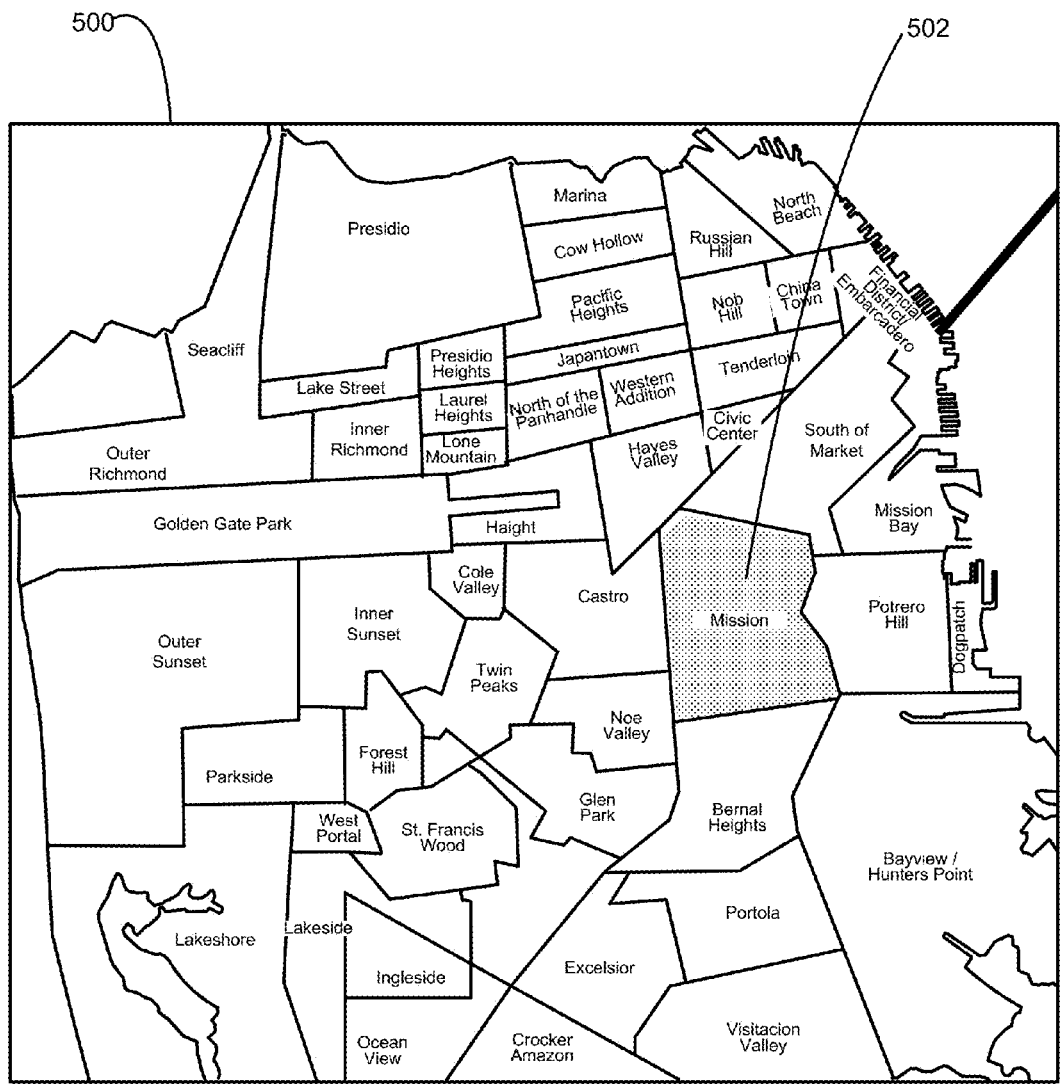
FIG. 5 illustrates a geographical subdivision region indicator displayed on a map, according to some embodiments.

FIG. 5 illustrates a geographical subdivision region indicator displayed on a map, according to some embodiments. In some embodiments, region indicator 402 may be a geographical subdivision region indicator, as shown at 502. A geographical subdivision may be a neighborhood (e.g., the Mission, as indicated at 502), a city block, a theme park subdivision, a subdivision of a shopping mall or other shopping area, a zip code area, a city, a county, a state, and the like. Region indicator 502 is a position indicator that may be displayed on a map 500 on a display of mobile device 102. Map 500 may be a neighborhood map, road map, city map, zip code map, and/or any other map. In some embodiments, map 500 may be a map used with indoor and/or outdoor positioning, such as positioning performed using base stations 112-116 and/or SVs 118-122. In the illustrative example of FIG. 5, region indicator 502 includes a highlighted area and bolded text ("Mission").

In some embodiments, a user may share position information indicated by point indicator 202 and/or region indicator 402, e.g., by transmitting the position information to third parties, such as information collecting services or devices possessed by other users. A user may select to share a region indicator 402, e.g., for increased privacy and safety. The size and/or type of a region indicator to be displayed may be determined based on settings, e.g. user-input settings.

Figure 6:
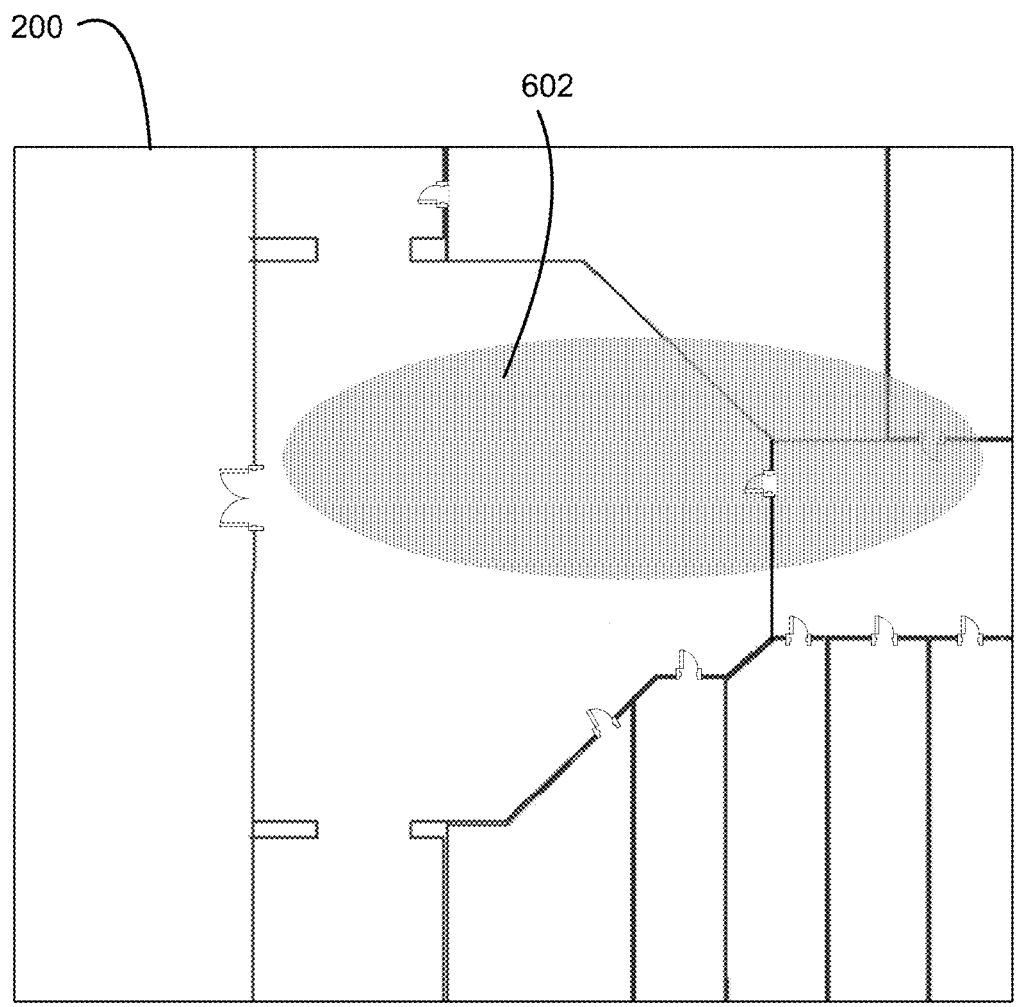
FIG. 6 illustrates a region indicator determined based on AP coverage, according to some embodiments.

FIG. 6 illustrates a region indicator determined based on AP coverage, according to some embodiments. In many situations, positioning may not be accurately determinable, e.g., in areas of an environment with relatively few APs or an environment in which line of sight to APs is obstructed by a structural barrier. In some embodiments, a heat map may be used to determine an area in which positioning accuracy is expected to be low, e.g., below a threshold accuracy value. Low accuracy region 602 may be a region determined by a coverage evaluation module.

One or more low accuracy regions 602 may be determined for a map 200 based on a heat map or other position data associated with map 200. For example, a low accuracy region 602 may be determined based on one or more grid points of a heat map where RSSI values above (or, in some embodiments, below) a threshold value are not available for more than two APs. The threshold RSSI value may be a value in the range of −80 db to −40 db. For example, the threshold RSSI value may be a value in the range of −70 db to −50 db, e.g., −60 db.

In an illustrative example, a heat map may indicate that a grid point receives signals from three APs (e.g., APs 106-110). The signals received from APs 106, 108, 110 are −65 db, −55 db, and −60 db. The RSSIs are compared to a threshold RSSI value of −60 db. The grid point receives a signal exceeding the threshold value from AP 106. The grid point does not receive a signal exceeding threshold value from AP 108 or AP 110. Because the grid point does not receive RSSI values above the threshold value from more than two APs, the grid point is determined to be part of a low accuracy region (e.g., low accuracy region 602).

In some embodiments, when a determined position is within a low accuracy region, a region indicator is used to display a position of a mobile device 102. The shape of low accuracy region 602 may be smoothed, rounded, and/or otherwise altered to create a visually appealing shape. Sensors on the mobile device (via dead reckoning, etc.) and/or other positioning systems and/or techniques may be used to help shape the region indicator. A low accuracy region indicator may be a region indicator 402 with a shape corresponding to low accuracy region 602. When positioning cannot be accurately determined, a position of mobile device 102 may be displayed using a low accuracy region indicator.

Figure 7:
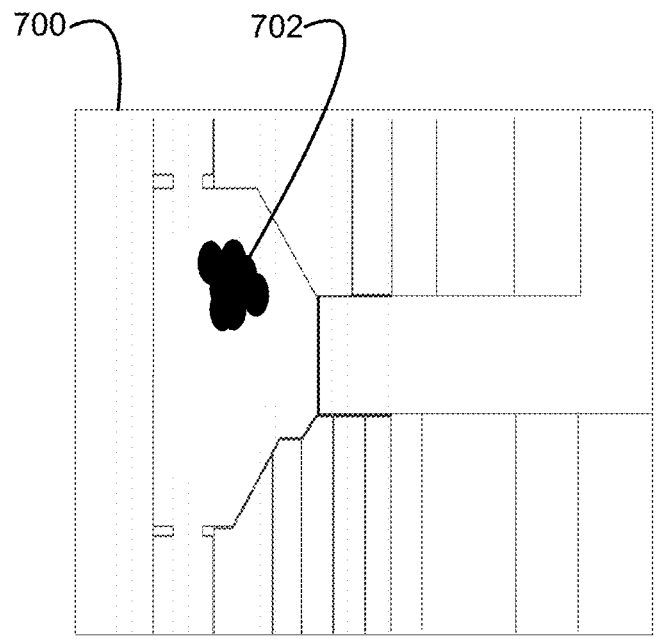
FIG. 7 illustrates a reduced scale map for displaying a position indicator, according to some embodiments.

FIG. 7 illustrates a reduced scale map for displaying a position indicator, according to some embodiments. Map 700 as shown in FIG. 7 is map 200 as shown in FIG. 2, with a reduced scale (i.e., "zoomed out") to show a larger area. In some embodiments, when position data is not accurately determinable, mobile device 102 may display map 700 instead of map 200. In this way, erratic movement of point indicator 702 (e.g., a point indicator as described with reference to point indicator 202) may be made less noticeable because point indicator 702 "hops" a lesser distance relative to the displayed reduced scale map 700.

In some embodiments, when reduced scale map 700 is displayed, the size of a point indicator 702 shown on reduced scale map 700 is greater than the size of point indicator 202 shown on map 200. In this way, movement of the position indicator over time due to reduced positioning accuracy may be made less noticeable to a user.

Figure 8:
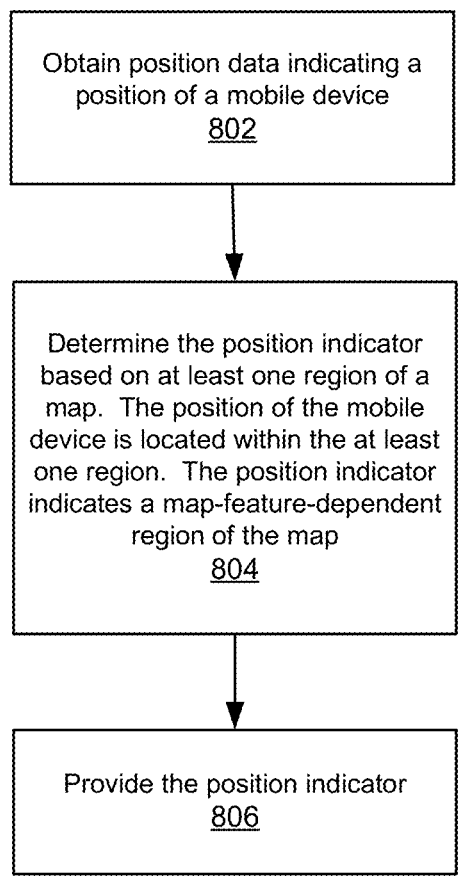
FIG. 8 is a flow diagram illustrating an example of a process for determining a position indicator, according to some embodiments.

FIG. 8 is a flow diagram illustrating an example of a process for determining a position indicator, according to some embodiments.

At operation 802, a receiver, such as mobile device 102 and/or server 104, obtains position data. For example, position data may be obtained via antenna 1218 of mobile device 102 or via communications subsystem 1012 of computing device 1000. Position data may include, for example, data indicating a position of mobile device 102, e.g., a position determined by server 104, and/or data usable by mobile device 102 to determine its position.

At operation 804, the receiver determines a position indicator based on at least one region of a map. In various embodiments, mobile device 102, server 104 and/or a computer receiving data from server 104 may determine the position indicator. The position of the mobile device may be located within the at least one region. The position indicator indicates a map-feature-dependent region of the map. The receiver may determine a map-feature-dependent region of the map based on one or more features of the map and/or other criteria, as described above.

In some embodiments, the position indicator is determined based on at least one of a privacy setting, an accuracy level of the position data, a variation of the position over a period of time, or any combination thereof. The accuracy level may include accuracy criteria and/or settings as discussed elsewhere herein.

At operation 806, the position indicator is provided. For example, server 104 may provide the position indicator to mobile device 102, and/or mobile device 102 may provide the position indicator to server 104.

Figure 9:
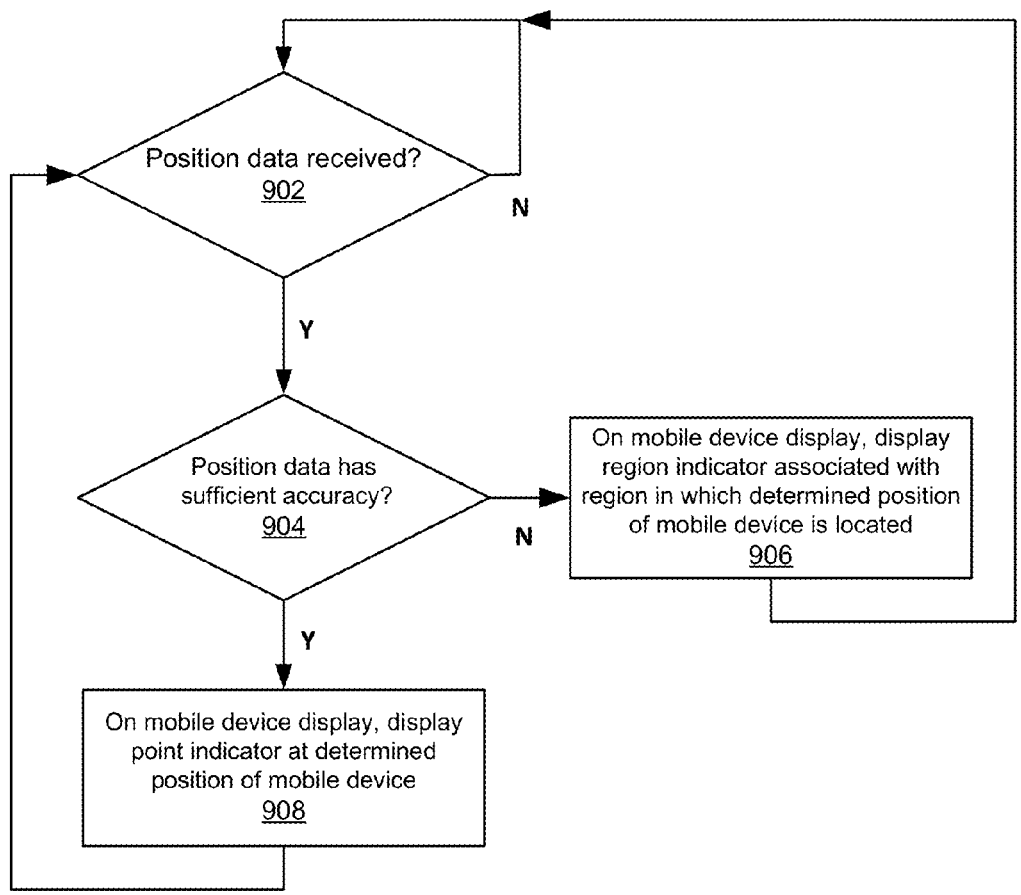
FIG. 9 is a flow diagram illustrating an example of a process for determining whether to display a point indicator or a region indicator, according to some embodiments.

FIG. 9 is a flow diagram illustrating an example of a process for determining a position indicator using a map-feature-dependent region of a map, according to some embodiments. A user may desire for mobile device 102 to switch between displaying point indicator 302 and region indicator 402, depending on the accuracy of position data determinable for mobile device 102 and/or based on a setting indicating a desired level of accuracy (e.g., to protect user privacy).

At operation 902, a device such as mobile device 102 or server 104 may determine whether position data is received by mobile device 102. For example, position data may be received via antenna 1218 of mobile device 102 or via communications subsystem 1012 of computing device 1000. In response to a determination that no position data is received, flow may return to operation 902. In response to a determination that position data is received by mobile device 102, flow may proceed to operation 904.

At operation 904, a processor 1104 of mobile device 102 may determine whether the accuracy of the received position data satisfies one or more accuracy criteria. Mobile device 102 may use approaches to comparing position data with accuracy criteria as discussed above to determine whether the accuracy of the received position data satisfies one or more accuracy criteria. If the one or more accuracy criteria are satisfied, mobile device 102 may determine that the position data has sufficient accuracy.

If the position data lacks sufficient accuracy, mobile device 102 may display a region indicator 402 associated with a region in which a determined position for the mobile device 102 is located, as indicated at operation 906. For example, the region indicator may be displayed by display 1222 of mobile device 102. In some embodiments, when region indicator 402 is shown, as indicated at operation 906, a map on which region indicator 402 is shown is shown with a reduced scale (i.e., "zoomed out") to show a larger area (e.g., as indicated in FIG. 7).

If the position data has sufficient accuracy, mobile device 102 may display a point indicator 302 at a determined position for the mobile device 102, as indicated at operation 908. For example, the point indicator may be displayed by display 1222 of mobile device 102.

In various embodiments, mobile device 102 can determine whether to display a point indicator and/or a region indicator based on the display size, application interface size on the display, the determined position, the position uncertainty, or any combination thereof. For example, some of these techniques may be used or combined to determine an aesthetically pleasing indicator (e.g., to avoid displaying a region indicator that fills a substantial portion of a displayed application interface).

It will be understood that one or more of the operations described with reference to FIG. 9 may be performed by server 104 or another device.

Figure 10:
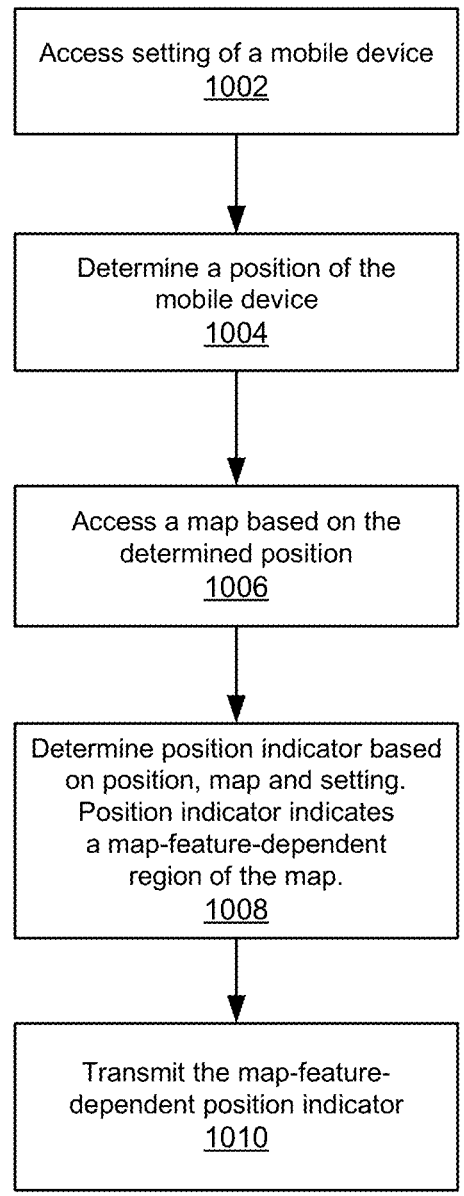
FIG. 10 is a flow diagram illustrating an example of a process for determining a position indicator using a setting on a mobile device, according to some embodiments.

FIG. 10 is a flow diagram illustrating an example of a process for determining a position indicator using a setting on a mobile device 102, according to some embodiments. Server 104 may use the setting to protect user privacy, for applications in which regional-level position data may be more useful than more precise position data, etc. For example, a traveling salesman may want to only see which streets they have already been to or their boss may want to see which streets the traveling salesman has been to as part of their job. Other examples of applications in which regional level position data may be desirable include tracking of employees in particular job functions: traveling salesman, repairman, street sweepers, garbage collection, trucking etc.

At operation 1002, server 104 accesses a setting of mobile device 102. The setting may be, for example, a position accuracy setting. The setting may be a default value, a setting received by the mobile device from a third party, and/or a setting received by the mobile device by a user (e.g., via user input received at the mobile device). The setting may include one or more values indicating an accuracy level with which a position indicator and/or position data is made available. For example, a position accuracy setting may indicate that a point indicator 202 is to be displayed on a user's mobile device and that a region indicator 402 is to be displayed on devices belonging to the user's contacts. In some embodiments, a position accuracy setting may include a minimum and/or maximum size of a position indicator. For example, mobile device 102 may receive input from a user indicating a minimum size of a map-feature-dependent region indicator 402 to be determined, transmitted and/or displayed.

A setting may include a time validity duration. The time validity duration may indicate the amount of time during which the position indicator is valid, e.g., from the time that the position indicator is transmitted at operation 1010. When the time validity duration expires, the position indicator may no longer be used (e.g., mobile device 102 ceases to display the position indicator) and/or server 104 may repeat one or more of operations 1002-1010 to transmit a new position indicator to mobile device 102, etc. In some embodiments, a time validity duration may be used only when mobile device 102 is in motion (e.g., as determined by accelerometer 1216 of mobile device 102.

In an alternative embodiment, server 104 may store a setting, such as a position accuracy setting. For example, server 104 may access a setting stored by server 104, e.g., in association with mobile device 102.

At operation 1004, server 104 determines a position of mobile device 102. For example, server 104 may receive position data from mobile device 102. In one embodiment, server 104 may use heat map data and received position data to determine a position of mobile device 102.

At operation 1006, server 104 accesses a map. For example, server 104 may determine a map to access using the position determined at operation 1004.

At operation 1008, server 104 determines a position indicator. Server 104 may determine the position indicator using the setting accessed at operation 1002, the position determined at operation 1004, and/or the map determined at operation 1006. In some embodiments, the position indicator may be a region indicator 402 that indicates a map-feature-dependent region of the map.

At operation 1010, server 104 transmits a position indicator, such as a map-feature-dependent position indicator, to mobile device 102. Mobile device 102 may display the position indicator received from server 104. In some embodiments, information such as setting information may be transmitted with the position indicator.

It will be understood that one or more of the operations described with reference to FIG. 10 may be performed by mobile device 102 or another device.

Figure 11:
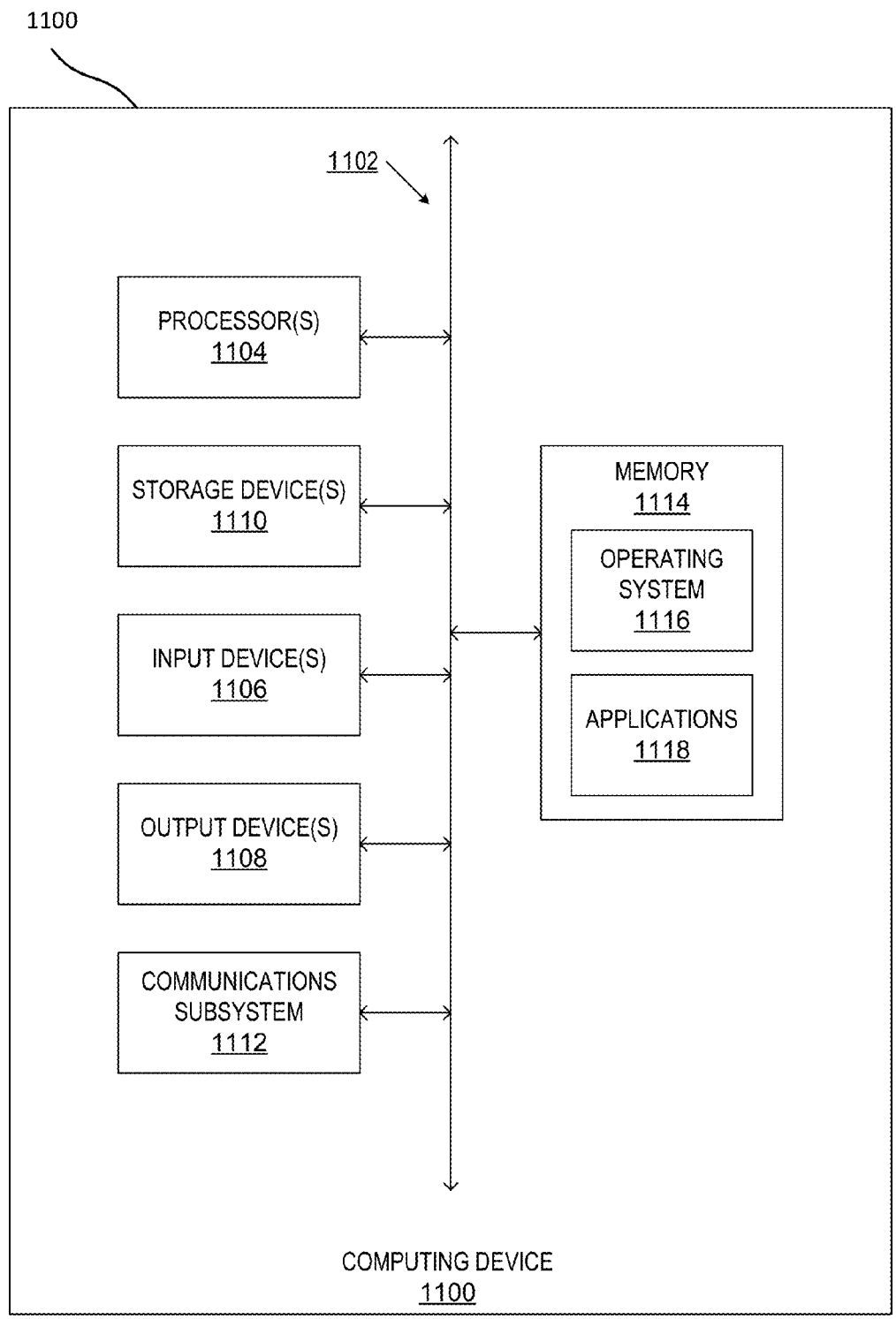
FIG. 11 illustrates an example of a computing system in which one or more embodiments may be implemented.

FIG. 11 illustrates an example of a computing system in which one or more embodiments may be implemented. A computer system as illustrated in FIG. 11 may be incorporated as part of the previously described computerized devices. For example, computer system 1100 can represent some of the components of the mobile device 102 and/or the server 104. Computer system 1100 may additionally represent any of the APs 106-110. Computer system 1100 may further store and/or execute various modules described herein.

FIG. 11 provides a schematic illustration of one embodiment of a computer system 1100 that can perform the methods provided by various other embodiments, as described herein, and/or can function as the host computer system, a remote kiosk/terminal, a point-of-sale device, a mobile device, and/or a computer system. FIG. 1100 is meant to provide a generalized illustration of various components, any or all of which may be utilized as appropriate. FIG. 1100, therefore, broadly illustrates how individual system elements may be implemented in a relatively separated or relatively more integrated manner.

The computer system 1100 is shown comprising hardware elements that can be electrically coupled via a bus 1102 (or may otherwise be in communication, as appropriate). The hardware elements may include one or more processors 1104, including without limitation one or more general-purpose processors and/or one or more special-purpose processors (such as digital signal processing chips, graphics acceleration processors, and/or the like); one or more input devices 1106, which can include without limitation a mouse, a keyboard and/or the like; and one or more output devices 1108, which can include without limitation a display device, a printer and/or the like. In one embodiment, the one or more processors 1104 may be used for comparing position data to at least one accuracy criterion. In one embodiment, the one or more processors 1104 may be used for determining a position indicator based on comparing position data to at least one accuracy criterion and a map.

The computer system 1100 may further include (and/or be in communication with) one or more non-transitory storage devices 1110, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1112, which can include without limitation a modem, a network card (wireless and/or wired), an infrared communication device, a wireless communication device and/or chipset (such as a Bluetooth™ device, an 802.11 device, a Wi-Fi device, a WiMax device, cellular communication facilities, etc.), and/or similar communication interfaces. A computing system may include one or more antennas for wireless communication as part of communications subsystems 1112 or as a separate component coupled to any portion of the system. The communications subsystem 1112 may permit data to be exchanged with a network (such as the network described below, to name one example), other computer systems, and/or any other devices described herein. In many embodiments, the computer system 1100 will further comprise a non-transitory working memory 1114, which can include a RAM and/or ROM device, as described above. In one embodiment, the communications subsystem 1112 may be used for receiving position data and/or determining the position of the computing system.

The computer system 1100 also can comprise software elements, shown as being currently located within the working memory 1114, including an operating system 1116, device drivers, executable libraries, and/or other code, such as one or more application programs 1118, which may comprise computer programs provided by various embodiments, and/or may be designed to implement methods, and/or configure systems, provided by other embodiments, as described herein. Merely by way of example, one or more procedures and/or modules described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1110 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an system configured to provide some or all of the features described herein can comprise hardware and/or software that is specialized (e.g., an application-specific integrated circuit (ASIC), a software method, etc.) or generic (e.g., processor(s) 1104, applications 1118, etc.) Further, connection to other computing devices such as network input/output devices may be employed.

Some embodiments may employ a computer system (such as the computer system 1100) to perform methods in accordance with the disclosure. For example, some or all of the procedures of the described methods may be performed by the computer system 1100 in response to processor 1104 executing one or more sequences of one or more instructions (which might be incorporated into the operating system 1116 and/or other code, such as an application program 1118) contained in the working memory 1114. Such instructions may be read into the working memory 1114 from another computer-readable medium, such as one or more of the storage device(s) 1110. Merely by way of example, execution of the sequences of instructions contained in the working memory 1114 might cause the processor(s) 1104 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1104 for execution and/or might be used to store and/or carry such instructions/code (e.g., as signals). In many implementations, a computer-readable medium is a physical and/or tangible storage medium. Such a medium may take many forms, including but not limited to, non-volatile media, and volatile media. Non-volatile media include, for example, optical and/or magnetic disks, such as the storage device(s) 1110. Volatile media include, without limitation, dynamic memory, such as the working memory 1114.

In some embodiments, a computer-readable medium may include transmission media. Transmission media include, without limitation, coaxial cables, copper wire and fiber optics, including the wires that comprise the bus 1102, as well as the various components of the communications subsystem 1112 (and/or the media by which the communications subsystem 1112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, and/or any other magnetic medium, a CD-ROM, any other optical medium, punch-cards, papertape, any other physical medium with patterns of holes, a RAM, a PROM, EPROM, a FLASH-EPROM, any other memory chip and/or cartridge, a carrier wave as described hereinafter, and/or any other medium from which a computer can read instructions and/or code.

Various forms of computer-readable media may be involved in carrying one or more sequences of one or more instructions to the processor(s) 1104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments.

The communications subsystem 1112 (and/or components thereof) generally will receive the signals, and the bus 1102 then might carry the signals (and/or the data, instructions, etc. carried by the signals) to the working memory 1114, from which the processor(s) 1104 retrieves and executes the instructions. The instructions received by the working memory 1114 may optionally be stored on a non-transitory storage device 1110 either before or after execution by the processor(s) 1104.

Figure 12:
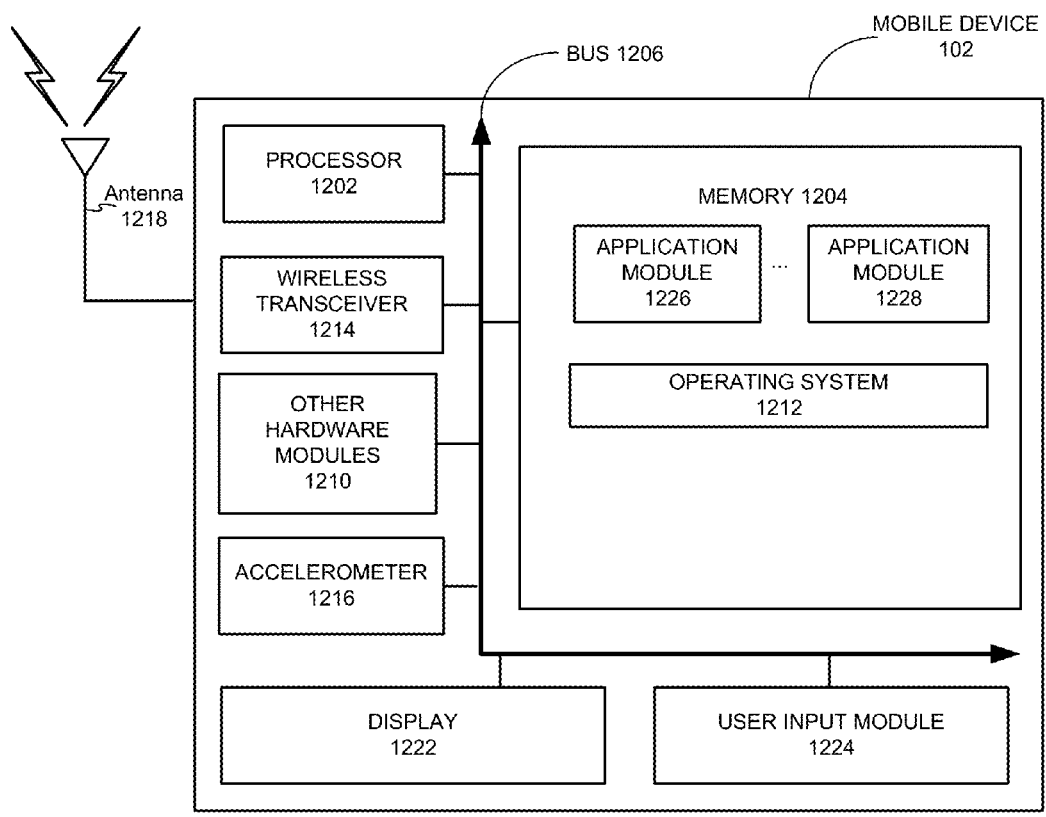
FIG. 12 illustrates an example of a mobile device, according to some embodiments.

FIG. 12 illustrates an example of a mobile device, according to some embodiments. Mobile device 102 includes a processor 1202 and a memory 1204. Mobile device 102 may use processor 1202 configured to execute instructions for performing operations at a number of components and can be, for example, a general-purpose processor or microprocessor suitable for implementation within a portable electronic device. Processor 1202 is communicatively coupled with a plurality of components within mobile device 102. For example, processor 1202 may communicate with the other illustrated components across a bus 1206. Bus 1206 can be any subsystem adapted to transfer data within mobile device 102. Bus 1206 can be a plurality of computer buses and include additional circuitry to transfer data. In one embodiment, the one or more processors 1202 may be used for comparing position data to at least one accuracy criterion. In one embodiment, the one or more processors 1202 may be used for determining a position indicator based on comparing position data to at least one accuracy criterion and a map.

Memory 1204 may be coupled to processor 1202. In some embodiments, memory 1204 offers both short-term and long-term storage and may in fact be divided into several units. Memory 1204 may be volatile, such as static random access memory (SRAM) and/or dynamic random access memory (DRAM) and/or non-volatile, such as read-only memory (ROM), flash memory, and the like. Furthermore, memory 1204 can include removable storage devices, such as secure digital (SD) cards. Thus, memory 1204 provides storage of computer-readable instructions, data structures, program modules, and other data for mobile device 102. In some embodiments, memory 1204 may be distributed into different hardware modules.

In some embodiments, memory 1204 stores a plurality of application modules 1226 through 1228, which may be any number of applications. Application modules contain particular instructions to be executed by processor 1202. In alternative embodiments, other hardware modules 1210 may additionally execute certain applications or parts of applications 1226-1228. In certain embodiments, memory 1204 may additionally include secure memory, which may include additional security controls to prevent copying or other unauthorized access to secure information.

In some embodiments, memory 1204 includes an operating system 1212. Operating system 1212 may be operable to initiate the execution of the instructions provided by application modules 1226-1228 and/or manage other hardware modules 1210 as well as interfaces with communication modules which may use wireless transceiver 1214. Operating system 1212 may be adapted to perform other operations across the components of mobile device 102 including threading, resource management, data storage control and other similar functionality.

In some embodiments, mobile device 102 includes a plurality of other hardware modules 1210. Each of other hardware modules 1210 is a physical module within mobile device 102. However, while each of hardware modules 1210 is permanently configured as a structure, a respective one of hardware modules 1210 may be temporarily configured to perform specific functions or temporarily activated. A common example is an application module that may program a camera module (i.e., hardware module) for shutter release and image capture. A respective one of hardware modules 1210 can be, for example, an accelerometer 1216, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, and/or any other similar module operable to provide sensory output and/or receive sensory input. In some embodiments, one or more functions of the hardware modules 1210 may be implemented in software. In one embodiment, the hardware modules 1210 may be used for receiving position data and/or determining the position of the computing system.

Mobile device 102 may include a component such as wireless communication module which may integrate antenna 1218 and wireless transceiver 1214 with any other hardware, firmware, and/or software necessary for wireless communications. Such a wireless communication module may be configured to receive signals from various devices such data sources via networks, access points, base stations, SVs, and the like, such as APs 106-110, base stations 112-116, SVs 118-122, etc. In one embodiment, the wireless communication module may be used for receiving position data and/or determining the position of the computing system.

In addition to other hardware modules 1210 and application modules 1226-1228, mobile device 102 may have a display 1222 and a user input module 1224. Display 1222 graphically presents information from mobile device 102 to the user. This information may be derived from one or more application modules 1226-1228, one or more hardware modules 1210, a combination thereof, and/or any other suitable means for resolving graphical content for the user (e.g., by operating system 1212). Display 1222 can be liquid crystal display (LCD) technology, light emitting polymer display (LPD) technology, and/or some other display technology. In some embodiments, display 1222 is a capacitive and/or resistive touch screen and may be sensitive to haptic and/or tactile contact with a user. In such embodiments, the display 1222 can comprise a multi-touch-sensitive display.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for determining a position indicator, comprising:
   obtaining position data indicating a position of a mobile device;
   accessing a map based on the position of the mobile device, the map having a plurality of regions wherein each region is bounded by one or more features of the map;
   determining the position indicator based on:
      the position of the mobile device, and
      at least one region of the plurality of regions of the map, wherein the position of the mobile device is located within the at least one region,
      wherein a type of the position indicator is determined based on at least one of:
         a privacy setting,
         an accuracy level of the position data,
         a variation of the position over a span of time, or
         any combination thereof,
         wherein the type of position indicator is indicative of a shape of the at least one region of the map; and
   displaying the position indicator on a device display.

2. The method of claim 1, further comprising displaying, by the device display, the map.

3. The method of claim 1, wherein the accuracy level is determined using a horizontal dilution of precision (HDOP) value.

4. The method of claim 1, wherein the position data includes received signal strength indication (RSSI) data received by the mobile device from at least one access point (AP), wherein the accuracy level is determined using minimum number of access points (APs) with an associated RSSI exceeding a threshold value.

5. The method of claim 1, wherein the accuracy level includes a minimum divergence between the position data for a period of time and output of an accelerometer of the mobile device for the period of time.

6. The method of claim 1, wherein the at least one region of the map is a room of a floor plan.

7. The method of claim 1, wherein the at least one region of the map is a geographical subdivision.

8. A system for determining a position indicator, the system comprising:
a processor; and
a memory coupled to the processor and configurable for storing instructions;
wherein the processor is configured to:
obtain position data indicating a position of a mobile device;
access a map based on the position of the mobile device, the map having a plurality of regions wherein each region is bounded by one or more features of the map;
determine the position indicator based on:
the position of the mobile device, and
at least one region of the plurality of regions of the map, wherein the position of the mobile device is located within the at least one region,
wherein the processor is configured to determine a type of the position indicator based on at least one of:
a privacy setting,
an accuracy level of the position data,
a variation of the position over a span of time, or
any combination thereof; and
display the position indicator on a device display.

9. The system of claim 8, wherein the map is displayed by the device display.

10. The system of claim 8, wherein the accuracy level is determined using a horizontal dilution of precision (HDOP) value.

11. The system of claim 8, wherein the position data includes received signal strength indication (RSSI) data received by the mobile device from at least one access point (AP), wherein the accuracy level is determined using a minimum number of access points (APs) with an associated RSSI exceeding a threshold value.

12. The system of claim 8, wherein the accuracy level includes a minimum divergence between the position data for a period of time and an output of an accelerometer of the mobile device for the period of time.

13. The system of claim 8, wherein the at least one region of the map is a room of a floor plan.

14. The system of claim 8, wherein the at least one region of the map is a geographical subdivision.

15. A non-transitory computer-readable storage medium storing computer executable code for determining a position indicator, comprising:
obtaining position data indicating a position of a mobile device;
accessing a map based on the position of the mobile device, the map having a plurality of regions wherein each region is bounded by one or more features of the map;
determining the position indicator based on:
the position of the mobile device, and
at least one region of the plurality of regions of the map, wherein the position of the mobile device is located within the at least one region,
wherein a type of the position indicator is determined based on at least one of:
a privacy setting,
an accuracy level of the position data,
a variation of the position over a span of time, or
any combination thereof; and
displaying the position indicator on a device display.

16. The non-transitory computer-readable storage medium of claim 15, further comprising displaying, by the device display, the map.

17. The non-transitory computer-readable storage medium of claim 15, wherein the accuracy level is determined using a minimum horizontal dilution of precision (HDOP) value.

18. The non-transitory computer-readable storage medium of claim 15, wherein the accuracy level includes a minimum divergence between the position data for a period of time and output of an accelerometer of the mobile device for the period of time.

19. The non-transitory computer-readable storage medium of claim 15, wherein the at least one region of the map is a room of a floor plan.

20. The non-transitory computer-readable storage medium of claim 15, wherein the at least one region of the map is a geographical subdivision.

21. A mobile device for determining a position indicator, comprising:
means for obtaining position data indicating a position of the mobile device;
means for accessing a map based on the position of the mobile device, the map having a plurality of regions wherein each region is bounded by one or more features of the map;
means for determining the position indicator based on:
the position of the mobile device, and
at least one region of the plurality of regions of the map, wherein the position of the mobile device is located within the at least one region of the map,
wherein a type of the position indicator is determined based on at least one of:
a privacy setting,
an accuracy level of the position data,
a variation of the position over a span of time, or
any combination thereof; and
means for displaying the position indicator on a device display.

* * * * *